(12) United States Patent
Pfaff

(10) Patent No.: US 8,500,170 B2
(45) Date of Patent: Aug. 6, 2013

(54) AERODYNAMICALLY-SHAPED FUEL TANK

(76) Inventor: Raimund Pfaff, Carter Lake, IA (US)

( * ) Notice: Subject to any disclaimer, the term of this patent is extended or adjusted under 35 U.S.C. 154(b) by 218 days.

(21) Appl. No.: 13/134,405

(22) Filed: Jun. 7, 2011

(65) Prior Publication Data

US 2012/0313348 A1    Dec. 13, 2012

(51) Int. Cl.
*B60P 3/22*    (2006.01)

(52) U.S. Cl.
USPC .......................................... 280/837; 220/4.14

(58) Field of Classification Search
USPC ................ 280/837; 220/4.14, 4.15; D12/218
See application file for complete search history.

(56) References Cited

U.S. PATENT DOCUMENTS

| | | | | |
|---|---|---|---|---|
| 2,731,278 A | * | 1/1956 | Soderstrom | 251/149.7 |
| 2,952,427 A | * | 9/1960 | Armstrong | 244/135 R |
| 3,498,572 A | * | 3/1970 | Lumn | 244/1 A |
| 4,511,105 A | * | 4/1985 | Morrisey | 244/135 R |
| 4,715,417 A | * | 12/1987 | Coloney | 220/666 |
| 4,790,350 A | * | 12/1988 | Arnold | 137/588 |
| 4,948,070 A | * | 8/1990 | Lyman | 244/135 R |
| 5,467,889 A | * | 11/1995 | Ashton et al. | 220/562 |
| 6,491,255 B1 | * | 12/2002 | Bracken et al. | 244/135 R |

FOREIGN PATENT DOCUMENTS

WO    WO 2010077187 A1 * 7/2010

* cited by examiner

*Primary Examiner* — Kevin Hurley
(74) *Attorney, Agent, or Firm* — Dennis L. Thomte; Thomte Patent Law Office LLC

(57) ABSTRACT

An aerodynamically-shaped fuel tank is provided for a refrigeration unit mounted on the forward end of a truck body. The fuel tank includes a cylindrical main body portion having forward and rearward ends. An aerodynamically-shaped nose portion extends forwardly and upwardly from the forward end of the main body portion. An aerodynamically-shaped tail portion extends rearwardly and upwardly from the rearward end of the main body portion.

12 Claims, 4 Drawing Sheets

AERODYNAMICALLY-SHAPED FUEL TANK

BACKGROUND OF THE INVENTION

1. Field of the Invention

This invention relates to an aerodynamically-shaped fuel tank and more particularly to an aerodynamically-shaped fuel tank for a refrigeration unit mounted on the forward end of a trailer or van.

2. Description of the Related Art

To the best of Applicant's knowledge, almost all, if not all, refrigerated vans or trailers which are pulled by a tractor or truck have a cylindrical fuel tank positioned beneath the floor of the van at one side thereof. The cylindrical fuel tank contains the fuel to run the refrigeration unit at the forward end of the van. The longitudinal axis cylindrical fuel tank is disposed transversely with respect to the van and creates a substantial aerodynamic drag which is reflected in the mileage of the truck. Even if the longitudinal axis of the fuel tank is disposed parallel to the direction of movement of the van, a significant aerodynamic drag will still be experienced.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An aerodynamically-shaped fuel tank is provided for use mounted on a refrigerated van body or trailer having a forward end, a rearward end, a first side, a second side, and an underside. A fuel-powered refrigeration unit is mounted at the forward end of the van body. This invention is mounted at the underside of the van body. The fuel tank of this invention comprises a cylindrical main body portion having a forward end, a rearward end, an upper end, and a lower end. The main body portion is elongated and cylindrical and is horizontally disposed with the longitudinal axis thereof being disposed parallel to the direction of the movement of the van body. An aerodynamically-shaped nose portion, having forward and rearward ends, extends forwardly from the forward end of the main body portion. The fuel tank of this invention also has an aerodynamically-shaped tail portion, having forward and rearward ends, extending rearwardly from the rearward end of the main body portion.

In the preferred embodiment, the fuel tank is comprised of a plastic material, a fiberglass material or a fiber-reinforced plastic material. The fuel tank could also be comprised of a metal material. In the preferred embodiment, the forward end of the nose portion is pointed. Also in the preferred embodiment, the upper rearward end of the tail portion is pointed. In the preferred embodiment, the nose portion tapers upwardly and inwardly from the rearward end to the forward end thereof. The tail portion tapers upwardly and inwardly from its forward end to its rearward end thereof.

It is therefore a principal object of the invention to provide an improved fuel tank which is aerodynamically-shaped to reduce drag on a van body or trailer.

A further object of the invention is to provide a fuel tank for a refrigeration unit mounted on the forward end of a van body.

A further object of the invention is to provide an aerodynamically-shaped fuel tank for a refrigeration unit of a refrigerated trailer with the fuel tank having a cylindrical main body portion and an aerodynamically tapered nose portion and an aerodynamically tapered tail portion.

A further object of the invention is to provide a fuel tank for a refrigeration unit for a refrigerated trailer or van wherein the longitudinal axis of the fuel tank is disposed parallel to the longitudinal axis of the van body or trailer.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
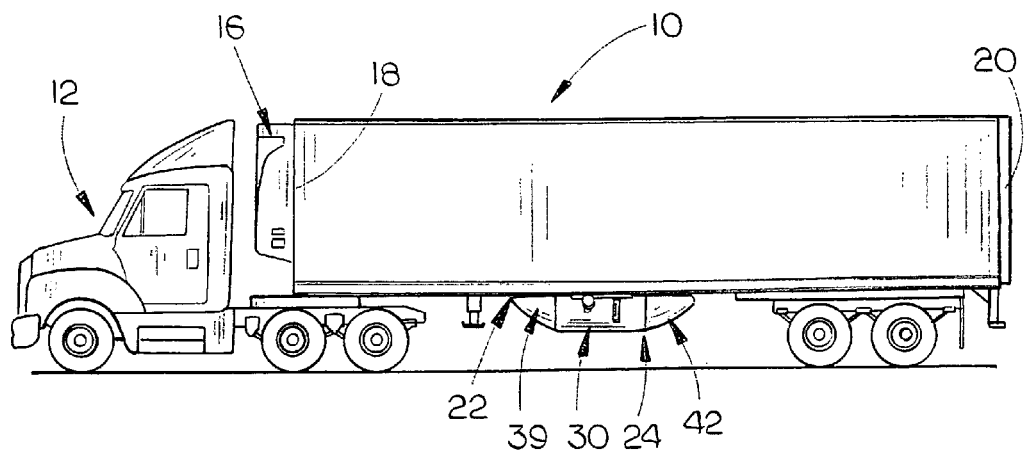
FIG. 1 is a side view of a refrigerated trailer having a fuel tank for the refrigeration unit thereof disposed below the floor of the trailer.
Figure 2:
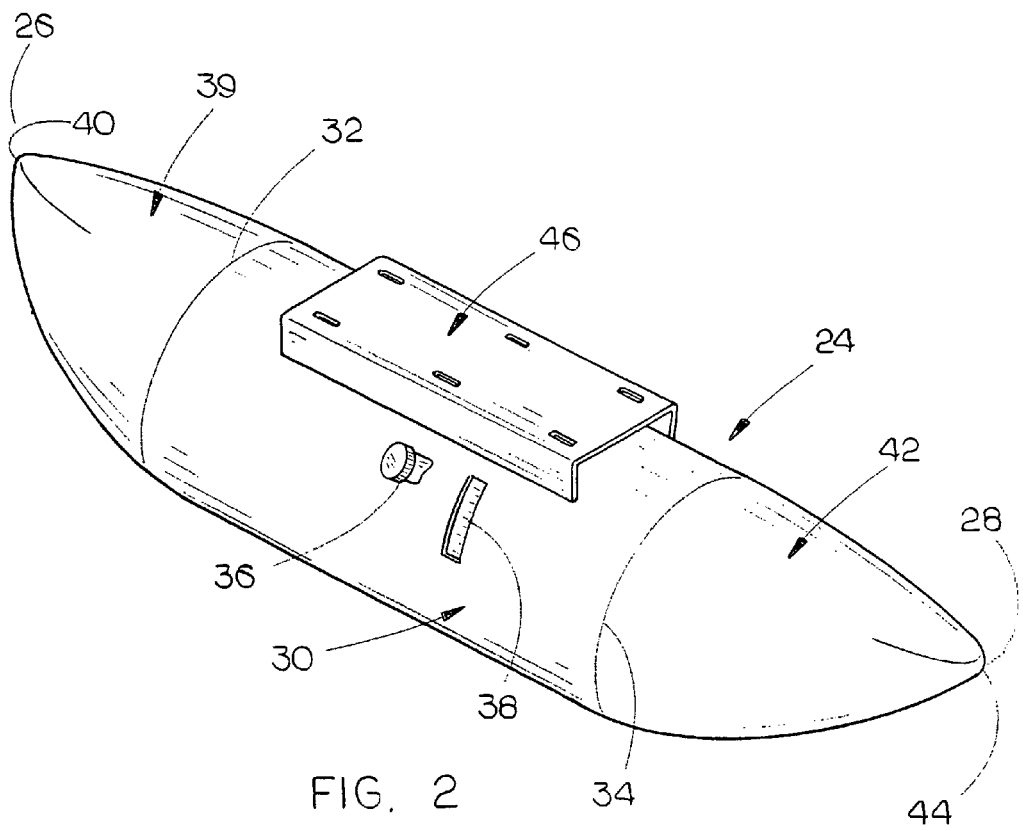
FIG. 2 is a rear perspective view of the fuel tank of this invention.
Figure 3:
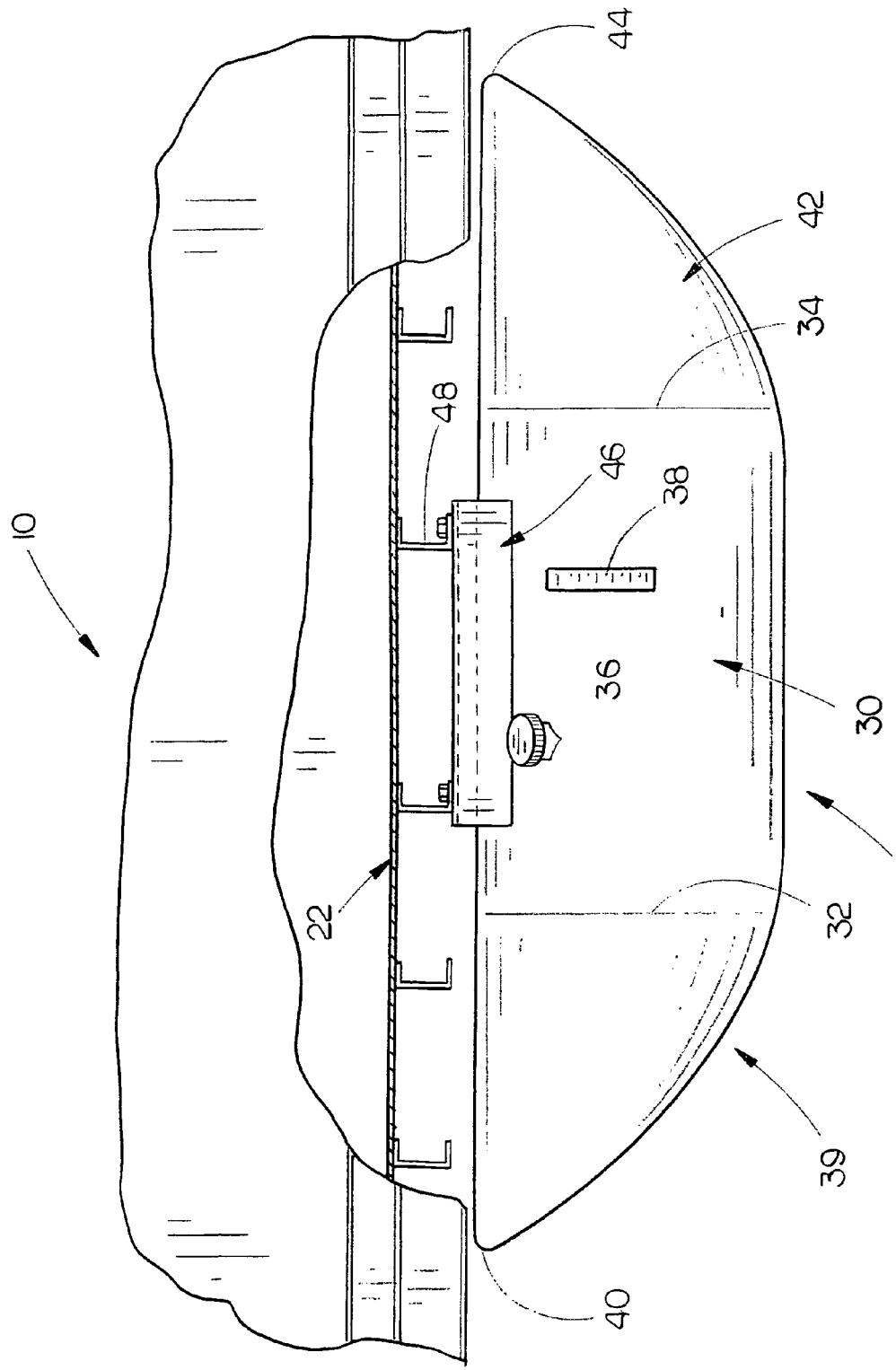
FIG. 3 is a side view of the fuel tank of this invention mounted below the floor of a trailer with portions of the trailer cut-away to more fully illustrate the invention.
Figure 4:
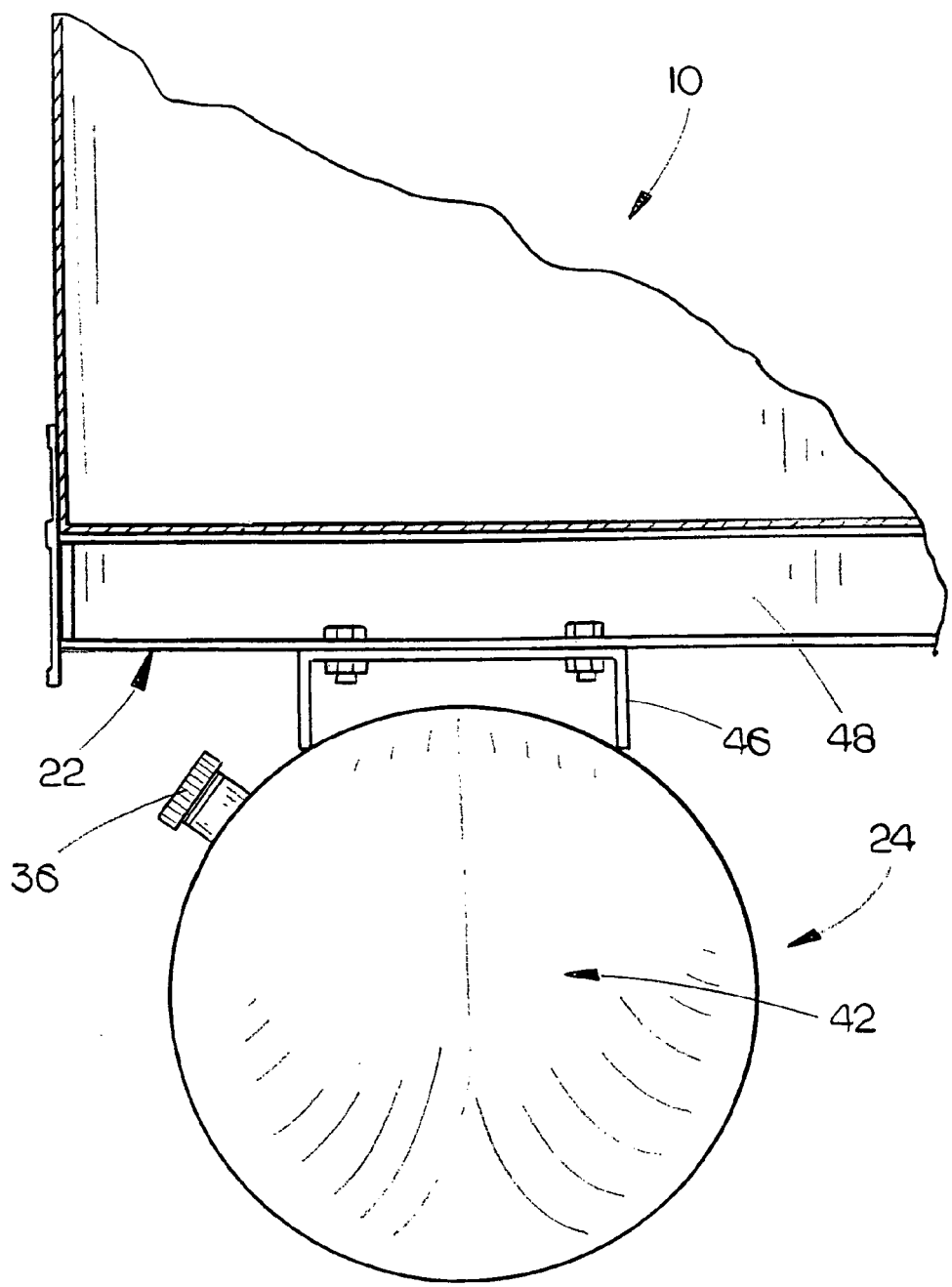
FIG. 4 is a rear view of the fuel tank of this invention.
Figure 5:
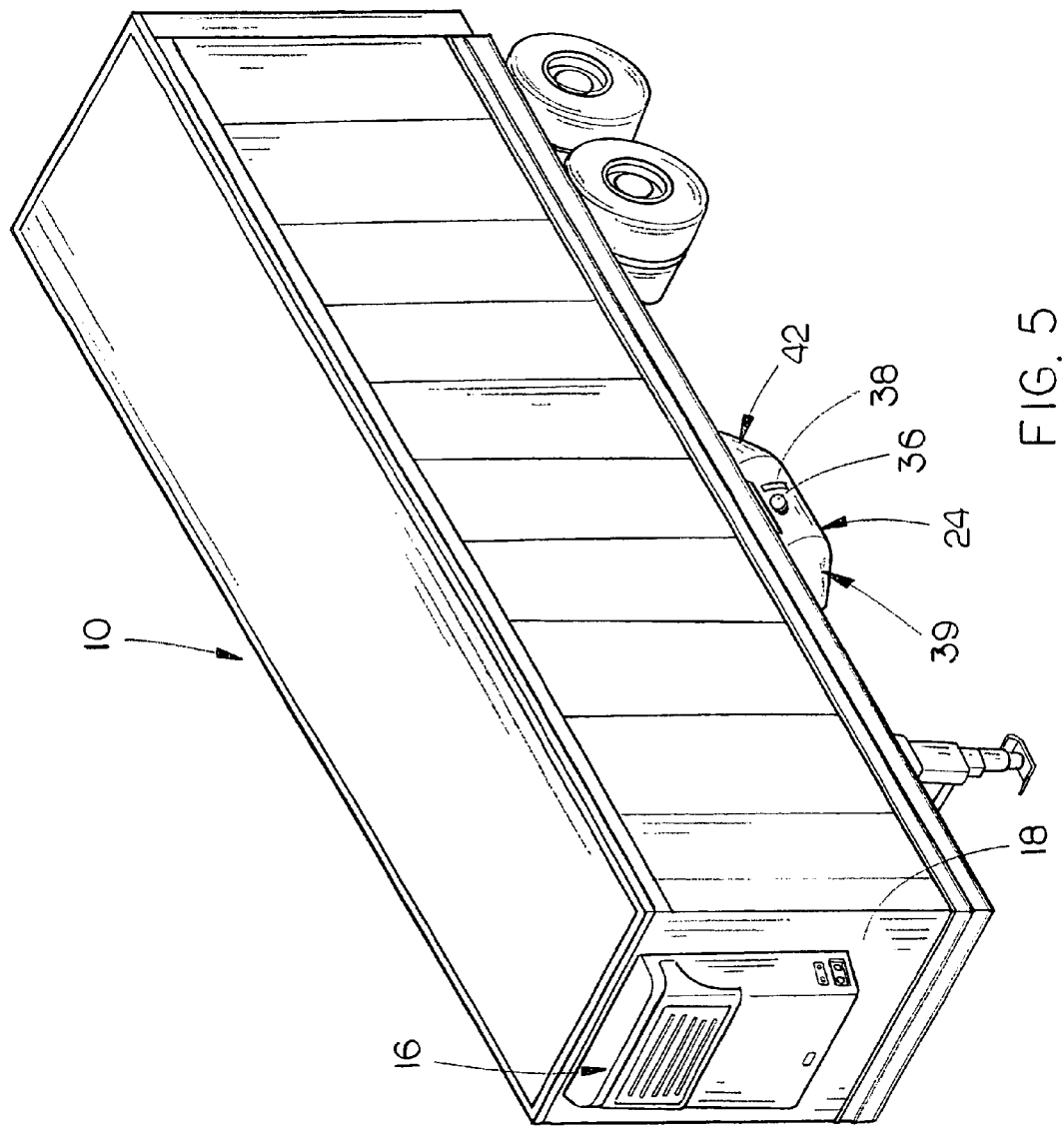
FIG. 5 is a front perspective view illustrating the fuel tank of this invention mounted below the floor of a refrigerated van body or trailer.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional refrigerated van body or trailer which is pulled by a truck or tractor 12 in conventional fashion. Trailer 10 includes a fuel powered refrigeration unit 16 at the forward end thereof. The fuel for the refrigeration unit is normally contained in a transversely extending cylindrical fuel tank which presents considerable aerodynamic drag. For purposes of description, trailer 10 will be described as having a forward end 18, a rearward end 20 and an underside or floor 22.

The aerodynamically designed fuel tank of this invention is referred to by the reference numeral 24 and replaces the conventional fuel tank for the refrigeration unit 16. Fuel tank 24 includes a forward end 26 and a rearward end 28 with a longitudinal axis of the fuel tank being disposed parallel to the longitudinal axis of the trailer 20. Fuel tank 24 includes a cylindrical main body portion 30 having a forward end 32 and a rearward end 34. A main body portion 30 has a fill opening 36 and a first gauge 28 is provided on the outer side thereof.

The numeral 39 refers to an aerodynamically shaped nose portion which extends in a tapered fashion upwardly, inwardly and forwardly from the lower end of the forward end 32 of main body portion 30 to a pointed nose 40 which is preferably in the same horizontal plane as the upper end of main body portion 30.

The numeral 42 refers to an aerodynamically-shaped tail portion which extends in a tapered fashion upwardly and rearwardly from the lower end of the rearward end 34 of main body portion 30 to a pointed tail 44 which is preferably in the same horizontal plane as the upper end of main body portion 30. Tail portion 42 is preferred but may be an optional feature of the fuel tank 24.

The fuel tank 24 is secured to the underside of the trailer 10 by any convenient means. As seen in the drawings, one possible way of securing the fuel tank 24 to the floor or underside 22 of the trailer 10 is to provide a channel mount 46 at the upper end of main body portion 30 and secure the mount 46 to the cross frames 48 at the underside of floor 22.

In use, the air impinging on the front of the fuel tank 24 will be deflected around the main body portion 30 due to the tapered configuration of nose portion 39 which substantially reduces the aerodynamic drag of the fuel tank. It is also believed that the tapered tail portion 42 also assists in the reduction of aerodynamic drag. Preferably, the fuel tank 24 is comprised of a plastic material, a fiberglass material or a fiber reinforced plastic material.

Thus it can be seen that the invention accomplishes at last all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:
   a van body having a forward end, a rearward end, a first side, a second side, and an underside;
   a fuel-powered refrigeration unit at said forward end of said van body;
   a fuel tank for said fuel-powered refrigeration unit at said underside of said van body;
   said fuel tank comprising:
   a cylindrical main body portion having a forward end, a rearward end, an upper end and a lower end;
   said main body portion being elongated, cylindrical and horizontally disposed;
   an aerodynamically-shaped nose portion, having forward and rearward ends, extending forwardly from said forward end of said main body portion;
   an aerodynamically-shaped tail portion, having forward and rearward ends, extending rearwardly from said rearward end of said main body portion;
   said fuel tank having a fill opening formed therein.

2. The combination of claim 1 wherein said fuel tank is comprised of a plastic material.

3. The combination of claim 1 wherein said fuel tank is comprised of a fiberglass material.

4. The combination of claim 1 wherein said fuel tank is comprised of a fiber reinforced plastic material.

5. The combination of claim 1 wherein said forward end of said nose portion is pointed.

6. The combination of claim 1 wherein said rearward end of said tail portion is pointed.

7. The combination of claim 1 wherein said nose portion tapers upwardly, forwardly and inwardly from said rearward end to said forward end thereof.

8. The combination of claim 1 wherein said tail portion tapers upwardly, rearwardly and inwardly from said forward end to said rearward end thereof.

9. The combination of claim 7 wherein said tail portion tapers upwardly, rearwardly and inwardly from said forward end to said rearward end thereof.

10. An aerodynamically-shaped fuel tank, comprising:
    a cylindrical main body portion having a forward end, a rearward end, an upper end and a lower end;
    said main body portion being elongated, cylindrical and horizontally disposed;
    an aerodynamically-shaped nose portion, having forward and rearward ends, extending forwardly from said forward end of said main body portion;
    an aerodynamically-shaped tail portion, having forward and rearward ends, extending rearwardly from said rearward end of said main body portion;
    said fuel tank having a fill opening formed therein;
    said nose portion tapering upwardly, forwardly and inwardly from said rearward end to said forward end thereof.

11. An aerodynamically-shaped fuel tank, comprising:
    a cylindrical main body portion having a forward end, a rearward end, an upper end and a lower end;
    said main body portion being elongate cylindrical and horizontally disposed;
    an aerodynamically-shaped nose portion, having forward and rearward ends, extending forwardly from said forward end of said main body portion;
    an aerodynamically-shaped tail portion, having forward and rearward ends, extending rearwardly from said rearward end of said main body portion;
    said fuel tank having a fill opening formed therein;
    said tail portion extending upwardly, rearwardly and inwardly from said forward end to said rearward end thereof.

12. An aerodynamically-shaped fuel tank, comprising:
    a cylindrical main body portion having a forward end, a rearward end, an upper end and a lower end;
    said main body portion being elongated, cylindrically and horizontally disposed;
    an aerodynamically-shaped nose portion, having forward and rearward ends, extending forwardly from said forward end of said main body portion:
    said fuel tank having a fill opening formed therein;
    said nose portion tapering upwardly, forwardly and inwardly from said rearward end to said forward end.

* * * * *